(12) United States Patent
Hwang et al.

(10) Patent No.: US 7,730,794 B2
(45) Date of Patent: Jun. 8, 2010

(54) METHOD FOR CLASSIFYING PASSENGERS

(75) Inventors: Jae Ho Hwang, Gyeonggi-do (KR);
Byeong Yeol Kim, Gyeonggi-do (KR)

(73) Assignee: Hyundai Mobis Co., Ltd., Gyeonggi-Do (KR)

( * ) Notice: Subject to any disclaimer, the term of this patent is extended or adjusted under 35 U.S.C. 154(b) by 0 days.

(21) Appl. No.: 12/038,111

(22) Filed: Feb. 27, 2008

(65) Prior Publication Data
US 2009/0071265 A1 Mar. 19, 2009

(30) Foreign Application Priority Data
Sep. 18, 2007 (KR) ............... 10-2007-0094833

(51) Int. Cl.
*G01D 1/00* (2006.01)
(52) U.S. Cl. .................................. 73/862.53
(58) Field of Classification Search ..................
73/862.041–862.046, 862.381–862.53
See application file for complete search history.

(56) References Cited
U.S. PATENT DOCUMENTS 6,329,913 B1* 12/2001 Shieh et al. ................. 340/561
6,490,515 B1* 12/2002 Okamura et al. ............... 701/49
6,609,054 B2* 8/2003 Wallace ....................... 701/45
6,636,792 B2* 10/2003 Lichtinger et al. ............ 701/45
6,696,948 B2* 2/2004 Thompson et al. .......... 340/561
6,957,591 B2* 10/2005 Takafuji et al. ......... 73/862.391
7,159,471 B2* 1/2007 Fortune et al. ................ 73/780
7,255,015 B2* 8/2007 McBride et al. ........ 73/862.474
2005/0082793 A1 4/2005 Lee
2005/0082800 A1 4/2005 Lim
2005/0082801 A1 4/2005 Koh
2005/0082806 A1 4/2005 Lee
2007/0138777 A1 6/2007 Oh
2008/0312795 A1* 12/2008 Cho et al. ..................... 701/45

* cited by examiner

*Primary Examiner*—Max Noori
(74) *Attorney, Agent, or Firm*—Shlesinger, Arkwright & Garvey LLP

(57) ABSTRACT

A method for classifying passengers comprises the steps of providing a plurality of load sensors disposed in a passenger seat of an automobile for measuring a load applied to the passenger seat; obtaining a sum by summing respective values obtained by multiplying respective load values measured from the plurality of load sensors by weighted load values of the respective load sensors; and comparing the sum with a reference value to classify a passenger on the passenger seat.

9 Claims, 5 Drawing Sheets

METHOD FOR CLASSIFYING PASSENGERS

BACKGROUND OF THE INVENTION

1. Field of the Invention

The present invention relates to an apparatus for determining whether to deploy an airbag cushion, which is an impact safety device, for each passenger in order to protect a passenger more safely in a vehicle crash, and its method.

2. Discussion of the Related Art

An airbag device is a device for protecting a passenger by absorbing a physical shock caused by a vehicle crash by using the elasticity of an airbag cushion. Such an airbag device may be classified into a driver seat airbag device, an assistant driver's seat airbag device, a side airbag device and so on.

By the way, an airbag cushion deployed by introducing gas into the airbag cushion is deployed at a high speed for the protection of passengers. Thus, if a passenger is an infant or a lightweight person, they may be instead injured by an impact caused by the deployment of the airbag cushion. Accordingly, whether to deploy the airbag cushion needs to be determined in consideration of the weight of a passenger. In consideration of this, the legislation of standards for restricting the deployment of an airbag cushion depending on the weight of a passenger weighed at a passenger seat under various conditions is in progress in North American regions. Therefore, airbag device manufacturers must prepare means to satisfy these conditions for enhancement of the performance of airbag devices and for export to North American regions. For this, conventionally, four or more load sensors are installed on a passenger seat to weigh the passenger according to the seated state of the passenger, and the sum of the load values measured by the respective load sensors is compared with a reference value, to thus determine whether to deploy the airbag cushion. However, an increase of the number of load sensors leads to the problem of increasing the cost of the airbag cushion and decreasing price competitiveness. Thus, the efforts for solving this problem are in progress, but the results of research are insignificant due to technical difficulties.

SUMMARY OF THE INVENTION

The present invention has been made in an effort to provide a technique of minimizing an error generated upon classifying passengers by optimizing the margin of classification by a load sensor, and reducing the number of load sensors required for a passenger classifying apparatus.

To achieve the foregoing object, there is provided an apparatus for classifying passengers in accordance with the present invention, which comprises a plurality of load sensors disposed in a passenger seat of an automobile for measuring a load applied to the passenger seat, for classifying the type of passengers by comparing the sum with a reference value, and the sum are obtained by summering the respective values, which are obtained by multiplying of respective load values measured from the plurality of load sensors by weighted load values of the respective load sensors which measured the load value.

The apparatus for classifying passengers may further comprise at least one dummy sensor having no load sensing function.

Preferably, the plurality of load sensors and the dummy sensor are disposed on edge regions of the bottom portion of the passenger seat, more preferably, corner regions of the bottom portion of the passenger seat. If the bottom portion of the passenger seat has four corner regions, the load sensors may be installed at three of the four corner regions, and the dummy sensor may be installed at the other one thereof.

The weighted load values may be set such that the classification margin can be the highest. The weighted load values may be determined such that the differences between a lowest adult test measurement weight value and a highest infant test measurement weight value can be the largest, the lowest adult test measurement weight value being the lowest of adult test measurement weight values measured when an adult dummy is seated on the passenger seat under a predetermined condition, and the highest infant test measurement weight value being the highest of infant test measurement weight values measured when an infant dummy is seated on the passenger seat under a predetermined condition.

More preferably, the weighted load values may be determined, under a first condition that the differences have the largest value, such that both of second and third conditions are satisfied, the second condition that the sum and the adult test measurement weight values are equal, and the sum is obtained by summering the values, which are obtained by multiplying respective load values measured from the plurality of load sensors when the adult dummy is seated on the passenger seat, by the respective weighted load values of the load sensor which measured the load value, and the third condition that the sum and the infant test measurement weight values are equal, and the sum is obtained by summering the values, which are obtained by multiplying respective load values measured from the plurality of load sensors when the infant dummy is seated on the passenger seat, by the respective weighted load values of the load sensor which measured the load value.

Additionally, it is preferred to satisfy a fourth condition that the sum of the weighted load values is equal to a predetermined limit value.

Meanwhile, when the load sensors consists of three load sensors, the weighted load values $X_1, X_2, X_3$ of the three respective load sensors may be determined so as to satisfy all of [Equation 1], [Equation 2], and [Equation 3] to be described later under the condition that [Equation 4] is satisfied:

$$A_i = X_{1i}*S_{1i} + X_{2i}*S_{2i} + X_{3i}*S_{3i} \quad \text{[Equation 1]}$$

wherein $A_i$ is an adult test measurement weight value measured in advance under a predetermined condition (i), $X_{ki}$ is a weighted load value of a k-th weight load sensor under the predetermined condition (i), and $S_{ki}$ is a load value measured by the k-the load sensor when the adult dummy is seated on the passenger seat, $$C_i = X_{1i}*S_{1i} + X_{2i}*S_{2i} + X_{3i}*S_{3i} \quad \text{[Equation 2]}$$

wherein $C_i$ is an infant test measurement weight value measured in advance under the predetermined condition (i), $X_{ki}$ is a weighted load value of a k-th weight load sensor under the predetermined condition (i), and $S_{ki}$ is a load value measured by the k-the load sensor when the infant dummy is seated on the passenger seat, $$X_{1i} + X_{2i} + X_{3i} = T \quad \text{[Equation 3]}$$

wherein $X_{ki}$ is a weighted load value of a k-th weight load sensor under the predetermined condition (i), and T is a specific limit value, $$\text{MAX}[\text{MIN}(A_i) - \text{MAX}(C_i)] \quad \text{[Equation 4]}$$

wherein $A_i, A_i$ is an adult test measurement weight value measured in advance under a predetermined condition (I), and $C_i$ is an infant test measurement weight value measured in advance under the predetermined condition (i).

The reference value may be the average value of the lowest value of the adult test measurement weight values measured in advance and the highest value of the infant test measurement weight values measured in advance.

In another aspect, there is provided a method for classifying passengers of a passenger classifying apparatus, the passenger classifying apparatus comprising a plurality of load sensors disposed in a passenger seat of an automobile for measuring a load applied to the passenger seat, for classifying the type of passengers by comparing the sum with a reference value, and the sum are obtained by summering the respective values, which are obtained by multiplying of respective load values measured from the plurality of load sensors by weighted load values of the respective load sensors which measured the load value.

The present invention provides the following effects.

First, the present invention can reduce the number of load sensors installed in a passenger classifying apparatus to thus cut down the production cost of the passenger classifying apparatus.

Second, the present invention can increase the reliability of classification of passengers with the improvement of the classification margin of passengers by applying the concept of weighted load values upon measuring the weight of a passenger seated on a passenger seat.

Third, the present invention can improve product competitiveness by reduction of the self-weight of the passenger classifying apparatus by substituting parts of the load sensors for a dummy sensor.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Hereinafter, a preferred embodiment of the present invention will be described with reference to FIGS. 1 to 5.

Figure 1:
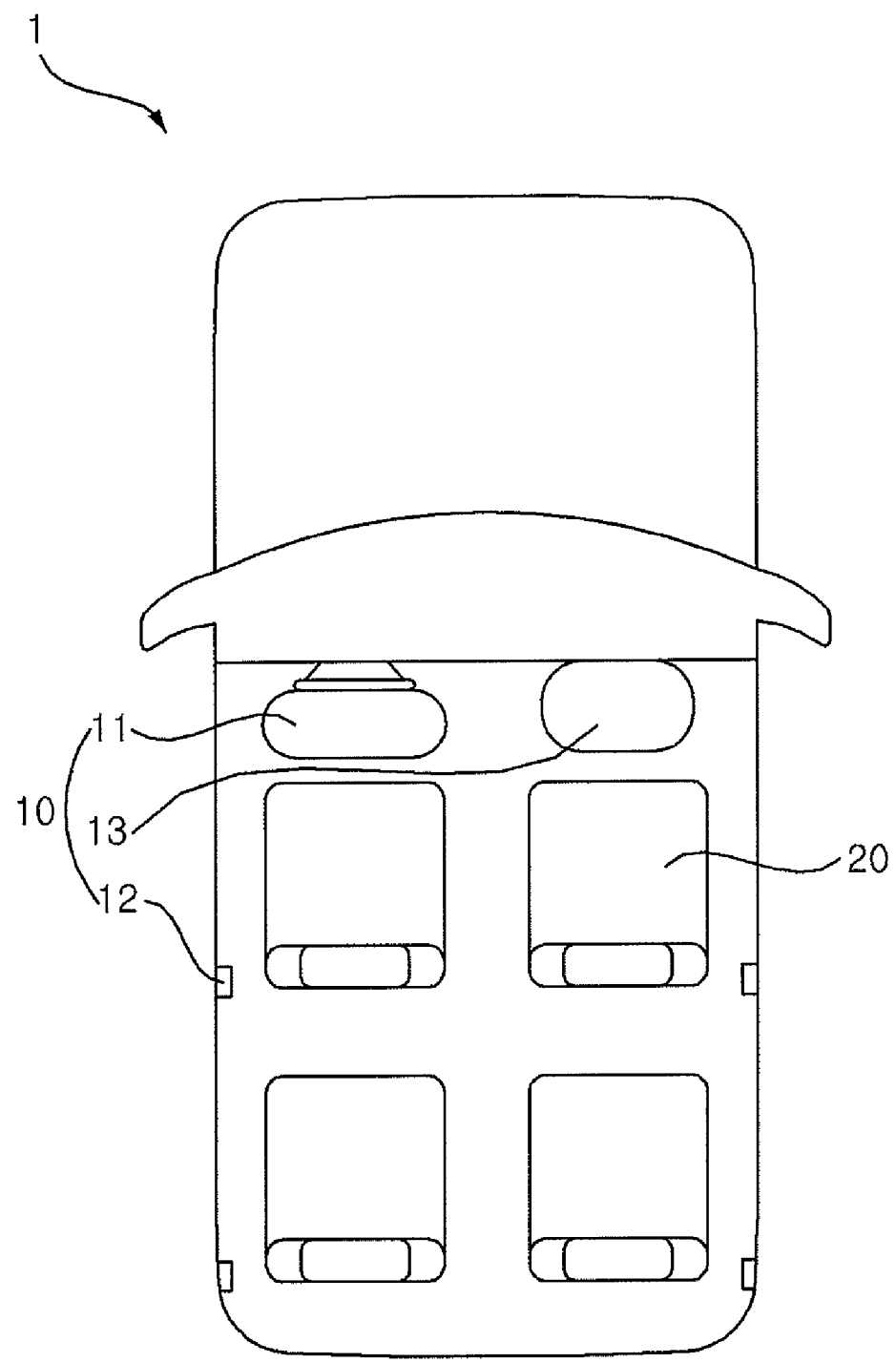
FIG. 1 is a plane view showing a passenger seat and an airbag device in an automobile of the present invention.

Firstly, an automobile of the present invention will be described with reference to FIG. 1. FIG. 1 is a plane view schematically showing an interior space and an airbag device of an automobile 1 of the present invention. In order to protect the safety of a passenger from an impact force generated in a collision of the automobile, the automobile 1 comprises an airbag device 10 and a passenger seat 20 on which a passenger is seated. The airbag device 10 can be classified into a driver seat airbag device 11 for preventing a driver from being injured in a front collision of the automobile, a front airbag device having an assistant driver's seat airbag device 13 for preventing a person sitting on the assistant driver's seat from being injured by an impact from a front collision of the automobile, and a side airbag device 12 for preventing a passenger from being injured by an impact from a side collision of the automobile.

The airbag device 10 protects a passenger by deploying an airbag cushion by gas ejected by the inflation of a gas ejector provided therein in the event of a car crash, thus making continuous use difficult if the airbag cushion is deployed upon a car crash. Therefore, the airbag cushion must be deployed under necessary circumstances. However, if the deployment of the airbag cushion is determined only on condition that a car crashes, for example, the airbag cushion is deployed even if no passenger is seated on the assistant driver's seat, and this may result in unnecessary additional costs. Accordingly, the deployment of the airbag cushion needs to be determined by identifying whether a passenger is seated or not.

Further, the airbag cushion included in the airbag device 10 is deployed at such a high speed as to reach approximately 250 km/h by the gas ejected from the gas ejector provided therein in the event of a car crash as described above. This is because the airbag cushion should be deployed faster than the passenger directly collides with a structure in the automobile by an inertial force generated by the collision of the automobile, so that the airbag cushion can perform its primary function. However, since the deployment speed of the airbag cushion is quite high, the kinetic energy of the airbag cushion is relatively large, and thus if the energy caused by the deployment of the airbag cushion is transferred to the passenger, the passenger may be injured due to the airbag cushion. Accordingly, it is not always preferable to deploy the airbag in a car crash, but the airbag should be deployed in consideration of the speed at which a passenger collides with an automobile structure in the event of a car crash and the deployment speed of the airbag cushion. Such a condition can be satisfied by measuring the load of the passenger seated on a passenger seat 20. In other words, if the load of the passenger is less than a predetermined level, the speed at which the passenger bounces off is increased due to an impact caused by the deployment of the airbag cushion. This may cause more serious injury due to the impact caused by the deployment of the airbag cushion, and thus the load of the passenger should be the consideration criteria of the deployment of the airbag cushion.

Based upon this issue, there is a need to establish specific standards so as to suppress the deployment of the airbag cushion if the load of the passenger seated is less than a predetermined level. In some countries, i.e., in North American regions, these standards are specified by the regulation (FMVSS 208), under which cars not meeting these standards are prohibited from import. These standards are established by measuring minimum 30 test items by using an adult dummy and minimum 1,200 test items by using an infant dummy.

Consequently, in order to ensure the safety of a passenger and export airbag devices to North American regions, airbag devices should be designed so as to determine the deployment of an airbag cushion by measuring the load of a passenger seated on the passenger seat 20 under various conditions and comparing the measured load with the aforementioned reference value. For this, an automobile has to be provided with means for determining the presence of a passenger seated on the passenger seat 20 and classifying the seated passenger is an infant or an adult.

Hereinafter, the passenger classifying apparatus 100 according to the present invention will be described with reference to FIGS. 2 and 3.

Figure 2:
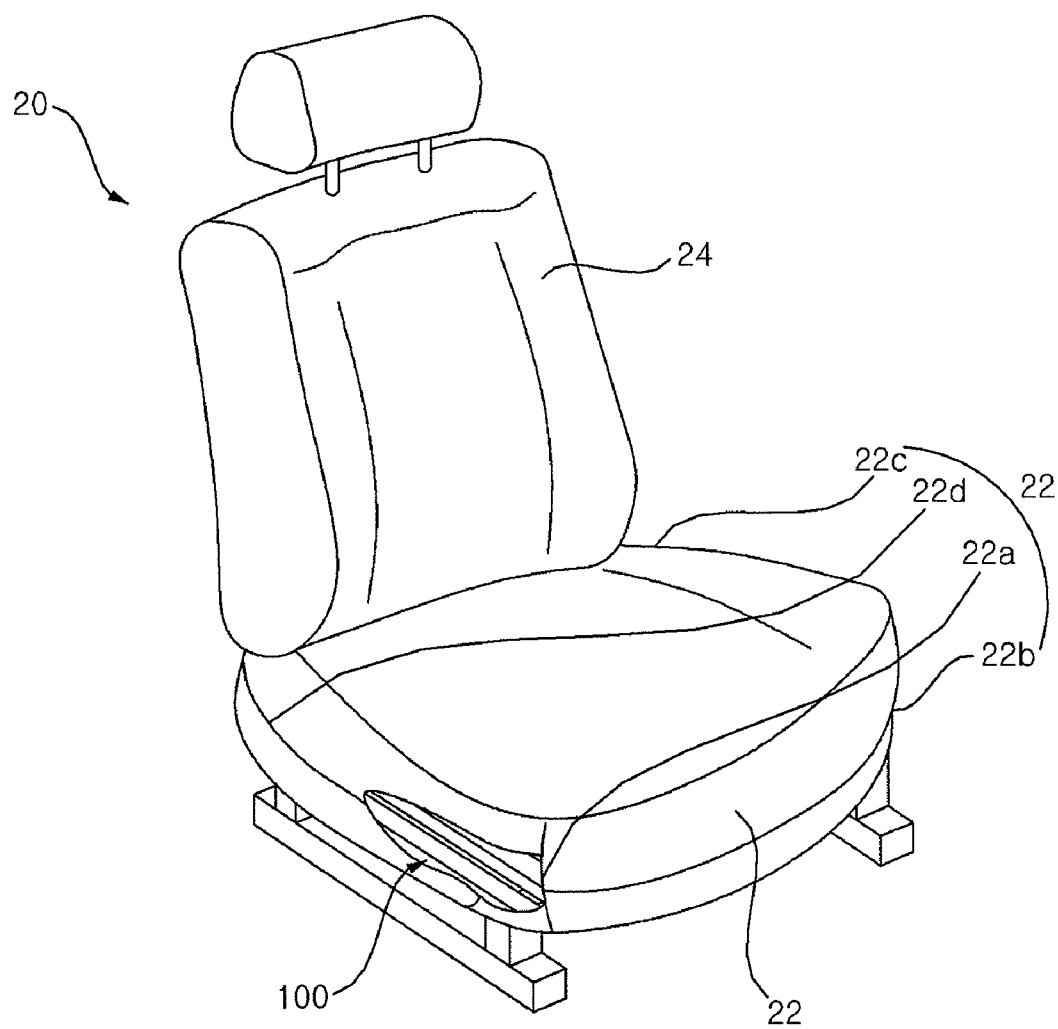
FIG. 2 is a partial cutaway view showing a passenger seat of the present invention.
Figure 3:
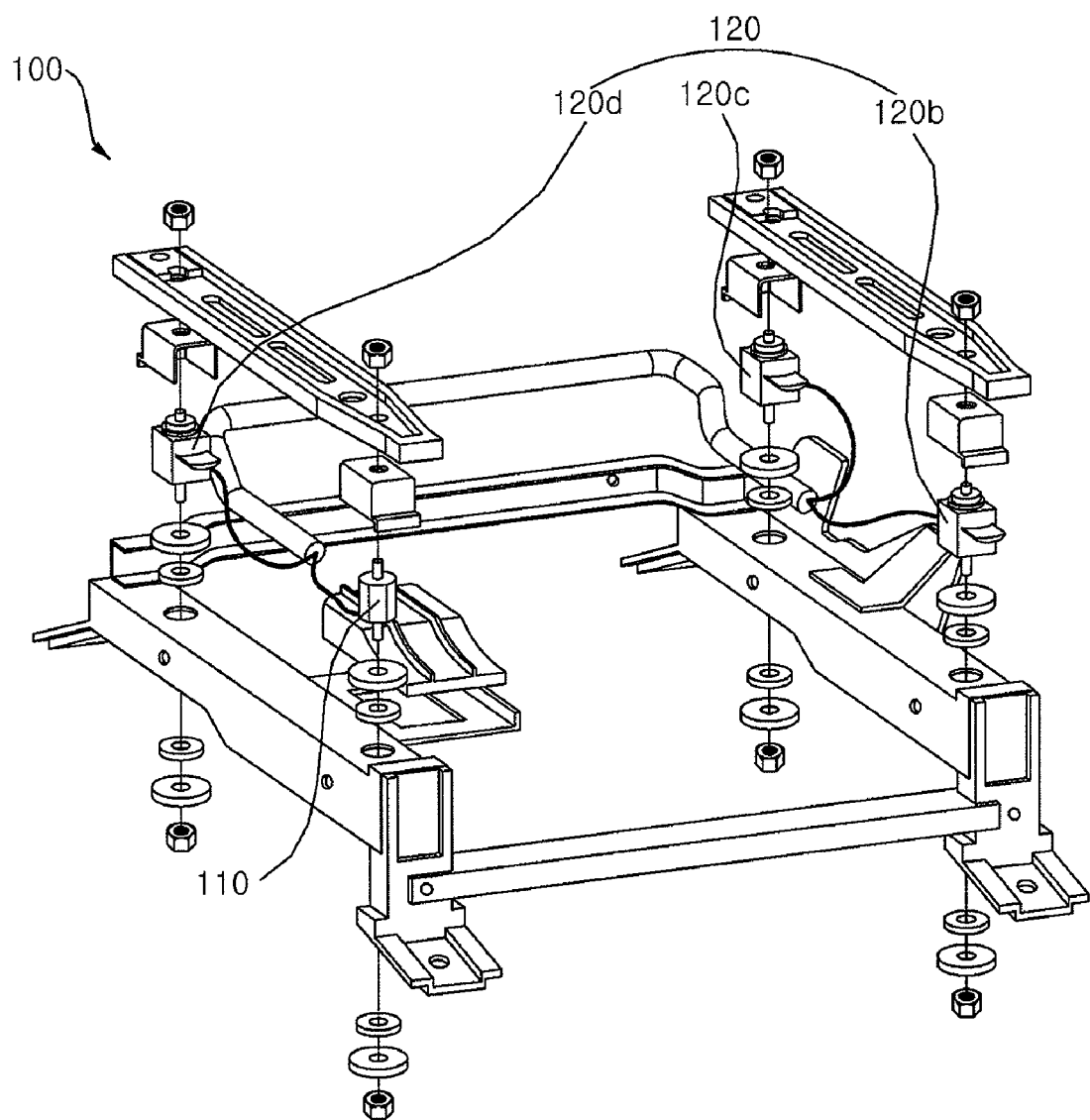
FIG. 3 is an inflated perspective view of a passenger classifying apparatus of the present invention.

FIG. 2 illustrates a perspective view of a passenger seat 20 of the present invention. FIG. 3 illustrates an inflated perspective view of a passenger classifying apparatus 100 of the present invention. The passenger seat 20 can be divided into a waist supporting portion 24 for supporting and backing the waist and back regions of a seated passenger and a bottom portion for supporting the load of the passenger. Although deviations exist according to the angle of the waist supporting portion 24 or the seated posture of the passenger, most of the weight of the passenger is supported by the bottom portion 22, and thus the passenger classifying apparatus 100 for classifying whether a passenger is seated and the type of the passenger is disposed in the bottom portion.

The passenger classifying apparatus includes a plurality of load sensors 120 for measuring the weight of a passenger seated on a passenger seat 20. First, second, and third load sensors 120b, 120c, and 120d, which are the load sensors 120, are disposed on edge regions of the bottom portion 22 of the passenger seat, more specifically, corner regions 22b, 22c, and 22d. However, the present invention is not necessarily limited to the case in which the load sensors 102 are disposed at the corner regions as depicted in FIG. 3. The load sensors can be disposed at various positions because the positions of the load sensors can be optimized according to various variables, such as the shape of the bottom portion 22, the seated state of the passenger, driving conditions, and so forth. While the present invention has been illustrated with respect to the case in which the load sensors 120 are disposed on three corner regions 22b, 22c, and 22d, respectively, among the corner regions of the bottom portion, the number of corner regions is merely optimization for the bottom portion having four corner regions, but the number thereof is not necessarily limited to three.

Meanwhile, the passenger classifying apparatus 100 may include at least one dummy sensor having no load sensing function. Such a dummy sensor 110 is a substitute for a conventional load sensor, which is enabled by improving the marginal rate of classification of the weight of a passenger by applying a weighted load value to be described later. However, the dummy sensor 110 is not a component that has to be necessarily provided in the present invention, and if the dummy sensor is omitted and some other structure than the dummy sensor is placed at the region where the dummy sensor 110 is disposed, this is enough to balance the bottom portion.

As the load sensors 120, various types of weight detecting sensors may be employed. For instance, they can be implemented by various means by those skilled in the art, including measuring the distortion of an elastic material distorted by a pressure applied to the bottom portion by the passenger, or sensing and measuring a change in resistance with pressure.

Hereinafter, the reason why a dummy sensor can be substituted for parts of the load sensors in the passenger classifying apparatus 100 of the present invention to thus reduce the number of load sensors will be described.

If the load sensors are installed on all of the corner regions 22a, 22b, 22c, and 22d of the bottom portion 220 of the passenger seat 20, the load sensors can detect the weight value of the passenger by measuring load values applied by the passenger and adding the load values. When various conditions, such as whether the passenger is wearing a safety belt, the seated posture of the passenger, etc., change, the load applied to the bottom portion by the passenger changes too, thereby changing the weight value thereof, but the change is within a predetermined range. And, the weight value measured in this manner is compared with a reference value specified in the US Regulation, and if the weight value exceeds the reference value, the passenger is identified to be an adult, and if the weight value is less than the reference value, the passenger is identified to be an infant or it is identified there is no passenger seated. In this state, in the event of a car crash during driving, if it is judged that the passenger is an adult, the airbag cushion is deployed to thus prevent the passenger from colliding with an interior structure of the automobile. On the other hand, if the seated passenger is identified to be an infant, the airbag cushion is not deployed to thus prevent injury caused by collision caused by the deployment of the airbag cushion. BY the way, the classification of passengers accompanies a certain error. Still, the classification of passengers is the most significant function of the passenger classifying apparatus, and thus it is preferred to adjust the margin of classification to a sufficiently large level so that the classification of passengers can be done properly around the reference value. However, the standards of the US regulation are very strict, so their classification margin should be considerably large. In order to maintain an appropriate margin of classification, a plurality of load sensors have to be disposed at proper positions in the passenger classifying apparatus. And, as shown in FIG. 2, in case of the bottom portion 20 of such a shape having four corner regions disposed therein, it is preferred to dispose the load sensors at the respective corner regions 22a, 22b, 22c, and 22d.

Under this circumstance, however, if at least one of the load sensors is substituted for a dummy sensor, it is difficult to maintain an appropriate margin of classification in various conditions that change by external variables, such as various seated states of a passenger. Accordingly, when using a passenger classifying apparatus for sensing a load by a general method, it is impossible to reduce the number of load sensors and substitute parts of the load sensors for a dummy sensor, especially, the standards of the US regulation cannot be satisfied.

However, in the present invention, at least one of the load sensors can be substituted for a dummy sensor by the concept of weighted load values to be derived as follows.

If a passenger is seated on the passenger seat 20, it is not possible to substitute parts of the load sensors for a dummy sensor and thus reduce the number of load sensors. This is because if the number of load sensors is reduced, the margin of classification of a seated passenger with respect to weight decreases, thereby deteriorating the performance of classification of passengers. Accordingly, if it is desired to reduce the number of load sensors, a sufficient classification margin should be ensured so that a passenger can be classified by the reduced number of load sensors. For this, in the sensing of loads by the respective first, second, and third load sensors 22b, 22c, and 22d, it is preferred to select respective weighted load values X1, X2, and X3 so that the classification margin can be the highest, thus optimizing the capability of identification for classifying passengers into infants and adults. Based upon this theoretical basis, the sum of values, which are obtained by multiplying respective load values S1, S2, and S3, measured by the first, second, and third load sensors 120b, 120c, and 120d provided in the passenger classifying apparatus when the passengers is seated on the passenger seat 20, by the aforementioned weighted load values X1, X2, and X3, are selected as the weight value W of the passenger, and this weight value is compared with the aforementioned reference value to classify the passenger, resultantly optimizing the classification margin. By employing this passenger classification method, the number of load sensors can be reduced.

Figure 4:
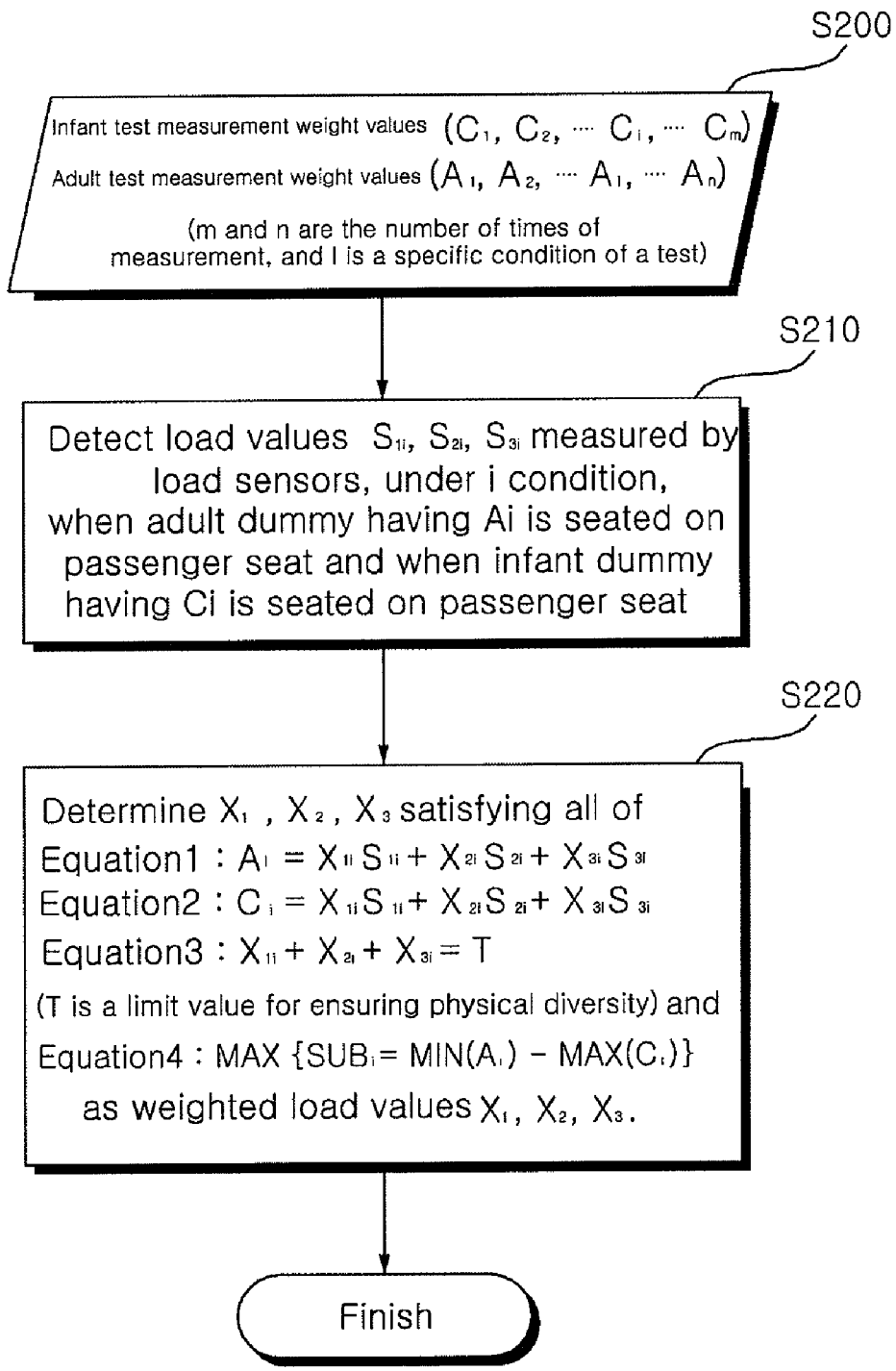
FIG. 4 is a sequential diagram showing a method for determining weighted load values of the passenger classifying apparatus of the present invention.

Hereinafter, the process of determining the weighted load values will be described with reference to FIG. 4.

As described above, in the step S200, infant test measurement weight values $C_i$ measured when an infant dummy (a dummy refers to a replica of a human being which is seated in a car in a crash test) are collected under a specific predetermined condition of a plurality of conditions specified in the US regulation (FMVSS 208), and adult test measurement weight values $A_i$ measured when an adult dummy is seated are collected under the same condition as the above predetermined condition.

The adult test measurement weight values $A_i$ may be in plural as they are repetitively measured several times under the above predetermined condition, and the adult test measurement weight values $C_i$ may be likewise in plural. These test measurement weight values may be the values measured in advance by the load sensors prior to the reduction of the number of load sensors. The above predetermined condition may represent one of seated states of a passenger specified in the US regulation (e.g., the passenger is seated with their legs crossed or is wearing the safety belt).

Thereafter, in the step 210, under the predetermined condition, the adult dummy is seated on the passenger seat 20 provided with the passenger classifying apparatus 100 of the present invention to measure load values $S_{1i}, S_{2i}, S_{3i}$ of the respective load sensors 120b, 120c, and 120d, and the infant dummy is seated on the passenger seat 20 provided with the passenger classifying apparatus 100 of the present invention to measure load values $S_{1i}, S_{2i}, S_{3i}$ of the respective load sensors 120b, 120c, and 120d.

Thereafter, the step S220 of determining weighted load values is performed. The determination of weighted load values may be performed as follows. Firstly, a lowest adult test measurement weight value and a highest infant test measurement weight value are found, the lowest adult test measurement weight value being the lowest of adult test measurement weight values measured when the adult dummy is seated on the passenger seat under the predetermined condition, and the highest infant test measurement weight value being the highest of infant test measurement weight values measured when the infant dummy is seated on the passenger seat under the predetermined condition. Afterwards, under the respective predetermined conditions, differences $SUB_i$ between the lowest adult test measurement weight value and the highest infant test measurement weight value are obtained. Also, the weighted load values are determined, under a first condition that the differences have the largest value, such that both of second and third conditions are satisfied, the second condition that the sum of values obtained by multiplying respective load values, which are measured by the plurality of load sensors when the adult dummy is seated on the passenger seat, by the respective weighted load values, and the adult test measurement weight values are equal to each other, and the third condition that the sum of values obtained by multiplying respective load values, which are measured by the plurality of load sensors when the infant dummy is seated on the passenger seat, by the respective weighted load values, and the infant test measurement weight values are equal to each other. At this time, even if the number of load sensors 120 is reduced, the load sensors 120 of the present invention have to maintain physical equality with the load sensors prior to the reduction of the number of load sensors. Thus, the respective weighted load values may be determined so as to satisfy a fourth condition that the sum of the respective weighted load values is equal to a specific value. At this time, the specific value may be set to four if the previous number of load sensors is four. However, it is apparent that the specific value is not necessarily limited to four or the number of load sensors.

Meanwhile, as illustrated in the embodiment of the present invention, if the number of load sensors is three, weighted load values $X_1, X_2, X_3$ may be determined under the following condition. Firstly, the condition of a test satisfying the following [Equation 4] is found. Then, under the condition that [Equation 4] is satisfied, the weighted load values $X_1, X_2, X_3$ satisfying all of [Equation 1], [Equation 2], and [Equation 3] are selected, and $X_1, X_2, X_3$ are determined as the weighted load values $X_1, X_2, X_3$.

By applying the weighted load values determined in such a manner, the classification margin of the load sensors is optimized, thereby reducing the number of load sensors.

Figure 5:
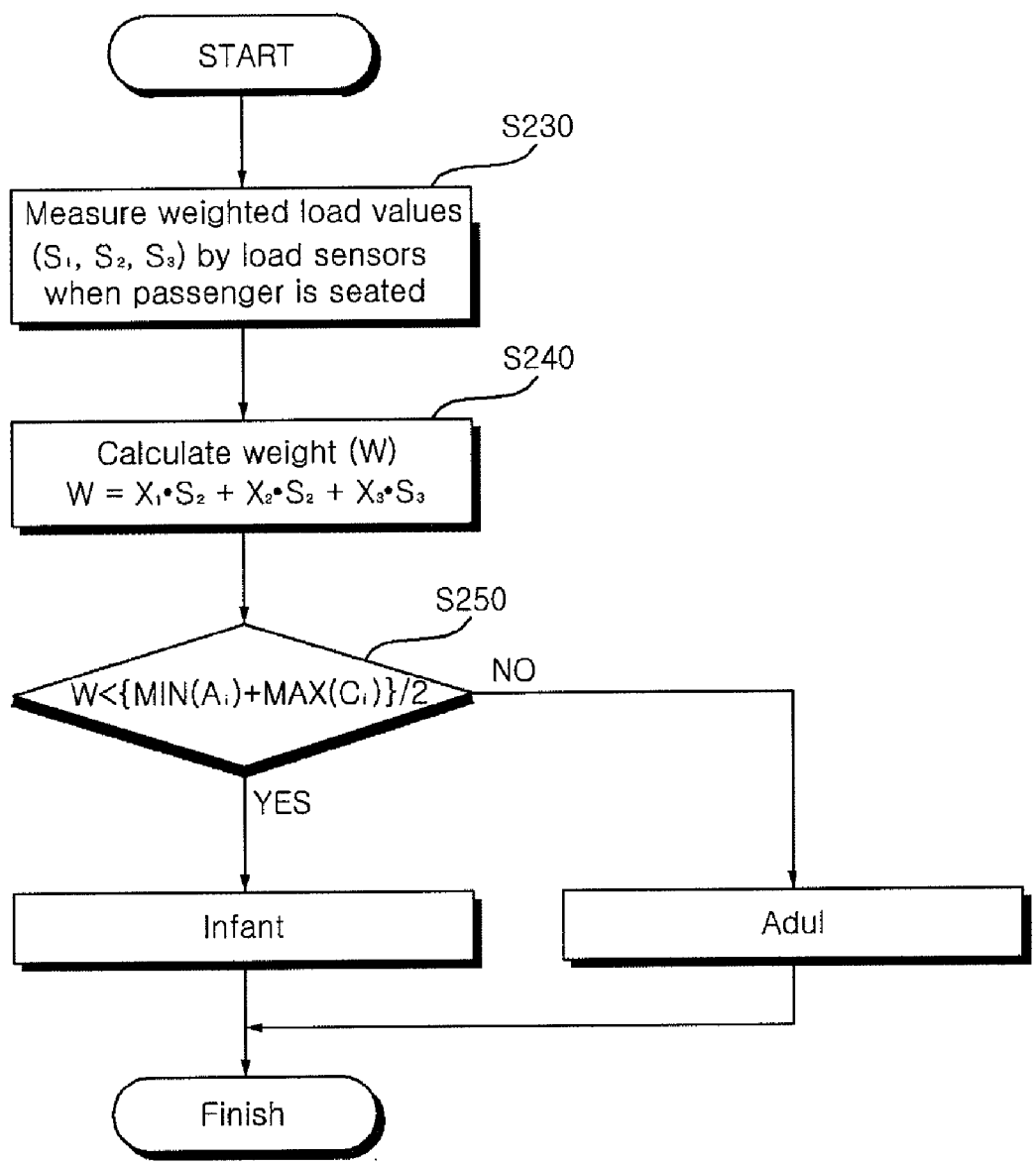
FIG. 5 is a sequential diagram showing a process of classifying passengers by the passenger classifying apparatus of the present invention.

Hereinafter, a method for classification of passengers by the passenger classifying apparatus 100 of the present invention will be described with reference to FIG. 5.

Firstly, in the step S230, when a passenger is seated on the passenger seat 20, the respective load sensors 120b, 120c, and 120d measure weighted load values $S_1, S_2, S_3$.

Next, the weight W of the passenger is calculated using the weighted load values $S_1, S_2, S_3$. Herein, the weight W can be derived by the following [Equation 5].

$$W = X_1 * S_1 + X_2 * S_2 + X_3 * S_3 \quad \text{[Equation 5]}$$

Next, in the step S250, the weight W is compared with a reference value to classify whether the weight is large or not. The reference value is preferably the average value of the lowest value of the adult test measurement weight values $A_i$ and the highest value of the infant test measurement weight values $C_i$. By setting the reference value as above, it is possible to optimize the classification margin of the weight W of a passenger detected by the load sensors in the classification area of adult and infant. However, the present invention is not limited to the reference value set as above.

As described above, the present invention has been described with reference to the embodiment shown in the drawings, but it is just for illustration only and those skilled in the art will understand that there are various modifications and equivalent other embodiments therefrom. Accordingly, the sincere technical scope of the invention should be defined based on the technical spirit of the appended claims.

What is claimed is:

1. A method for classifying passengers, comprising the steps of:
    providing a plurality of load sensors disposed in a passenger seat of an automobile for measuring a load applied to the passenger seat;
    obtaining a sum by summing respective values obtained by multiplying respective load values measured from the plurality of load sensors by weighted load values of the respective load sensors;
    comparing the sum with a reference value to classify a passenger on the passenger seat;
    wherein the plurality of load sensors consists of three load sensors and the weighted load values of the three respective load sensors are determined so as to satisfy all of [Equation 1], [Equation 2], and [Equation 3] under the condition that [Equation 4] is satisfied:

$$A_i = X1_i * S1_i + X2_i * S2_i + X3_i * S3_i \quad \text{[Equation 1]}$$

wherein $A_i$ is an adult test measurement weight value measured in advance under a predetermined condition (i), $X_{ki}$ is a weighted load value of a k-th load sensor under the predetermined condition (i), and $S_{ki}$ is a load value measured by the k-th load sensor when an adult dummy is seated on the passenger seat, $$C_i = X1_i * S1_i + X2_i * S2_i + X3_i * S3_i \quad \text{[Equation 2]}$$

wherein Ci is an infant test measurement weight value measured in advance under a predetermined condition (i), Xki is a weighted load value of a k-th load sensor under the predetermined condition (i), and Ski is a load value measured by the k-th load sensor when an infant dummy is seated on the passenger seat, $$X1i+X2i+X3i=T \quad \text{[Equation 3]}$$

wherein Xki is a weighted load value of a k-th weight load sensor under the predetermined condition (i) and T is a specific limit value, $$MAX[MIN(Ai)-MAX(Ci)] \quad \text{[Equation 4]}$$

wherein Ai is an adult test measurement weight value measured in advance under a predetermined condition (i), and Ci is an infant test measurement weight value measured in advance under the predetermined condition (i).

2. The method of claim 1, and further comprising the step of providing at least one dummy sensor having no load sensing function.

3. The method of claim 2, and further comprising the step of locating the plurality of load sensors and the dummy sensor on edge regions of a bottom portion of the passenger seat.

4. The method of claim 2, and further comprising the step of locating the plurality of load sensors and the dummy sensor on corner regions of a bottom portion of the passenger seat.

5. The method of claim 2, and further comprising the step of locating the plurality of load sensors at three corner regions of a bottom portion of the passenger seat, and the dummy sensor at a fourth corner region of the bottom portion.

6. The method of claim 2, wherein:
the weighted load values are determined such that the differences between a lowest adult test measurement weight value and a highest infant .test measurement weight value is maximum;
the lowest adult test measurement weight value being the lowest of adult test measurement weight values measured when an adult dummy is seated on the passenger seat under a predetermined condition; and
the highest infant test measurement weight value being the highest of infant test measurement weight values measured when an infant dummy is seated on the passenger seat under a predetermined condition.

7. The method of claim 6, wherein:
the weighted load values are determined, under a first condition that the differences have the largest value, such that both of second and third conditions are satisfied;
the second condition that the sum and the adult test measurement weight values are equal, and the sum is obtained by summing the values, which are obtained by multiplying respective load values measured from the plurality of load sensors when the adult dummy is seated on the passenger seat, by the respective weighted load values of the load sensor which measured the load value; and
the third condition that the sum and the infant test measurement weight values are equal, and the sum is obtained by summing the values, which are obtained by multiplying respective load values measured from the plurality of load sensors when the infant dummy is seated on the passenger seat, by the respective weighted load values of the load sensor which measured the load value.

8. The method of claim 7, wherein the weighted load values are determined so as to satisfy a fourth condition that the sum of the weighted load values is equal to a predetermined limit value.

9. The method of claim 1, wherein the reference value is an average value of a lowest value of the adult test measurement weight values measured in advance and the highest value of the infant test measurement weight values measured in advance.

* * * * *